(12) United States Patent
Roaks

(10) Patent No.: US 12,311,323 B2
(45) Date of Patent: May 27, 2025

(54) DEVICE FOR IMPROVING MIXING OF A LIQUID AND A POWDERED SUBSTANCE

(71) Applicant: Twistshake of Sweden AB, Vastera (SE)

(72) Inventor: Vienar Roaks, Vasteras (SE)

( * ) Notice: Subject to any disclaimer, the term of this patent is extended or adjusted under 35 U.S.C. 154(b) by 367 days.

(21) Appl. No.: 16/596,120

(22) Filed: Oct. 8, 2019

(65) Prior Publication Data

US 2020/0030757 A1 Jan. 30, 2020

Related U.S. Application Data

(62) Division of application No. 15/125,647, filed as application No. PCT/EP2015/025010 on Mar. 3, 2015, now Pat. No. 10,464,028.

(30) Foreign Application Priority Data

Mar. 14, 2014 (SE) .................................... 1450291-8

(51) Int. Cl.
*B01F 25/452* (2022.01)
*A47J 43/27* (2006.01)
*A61J 9/00* (2006.01)
*A61J 11/04* (2006.01)
*B01F 23/50* (2022.01)
*B01F 35/32* (2022.01)
*B01F 101/14* (2022.01)

(52) U.S. Cl.
CPC ........... *B01F 25/4521* (2022.01); *A47J 43/27* (2013.01); *A61J 9/00* (2013.01); *A61J 11/04* (2013.01); *B01F 23/50* (2022.01); *B01F 35/32021* (2022.01); *B01F 2101/14* (2022.01)

(58) Field of Classification Search
CPC ............ B01F 25/4521; B01F 35/32021; B01F 2101/14; A47J 43/27; A47J 9/00; A47J 11/04

See application file for complete search history.

(56) References Cited

U.S. PATENT DOCUMENTS

| | | | | |
|---|---|---|---|---|
| 1,878,924 A | * | 9/1932 | Will ..................... | A45D 33/003 366/130 |
| 2,234,397 A | * | 3/1941 | Bentz ...................... | A47J 31/06 D7/400 |
| 2,257,944 A | * | 10/1941 | Fischbein ............... | A47J 31/06 210/497.3 |
| 2,744,631 A | * | 5/1956 | Toombs ............. | A47G 19/2211 210/469 |

(Continued)

*Primary Examiner* — Tri M Mai
(74) *Attorney, Agent, or Firm* — Ingram IP Law, P.A.

(57) ABSTRACT

The technology includes a device for mixing a liquid and a powdered substance in a vessel. The device includes a body having a planar surface with a grid that includes a plurality of openings and at least two elongated apertures arranged in a circumferential direction. The openings and the elongated apertures are co-planar, with the at least two elongated apertures having a cross-sectional area that is more than twice as large as a cross-sectional area of the openings of the grid. The mixing device further includes a plurality of connection portions that extend between the grid and the rim to mechanically connect the grid and the rim. The connection portions are arranged so that at least two apertures are defined between the rim and the periphery of the grid.

16 Claims, 3 Drawing Sheets

(56) References Cited

U.S. PATENT DOCUMENTS

| | | | | | |
|---|---|---|---|---|---|
| 2,885,290 | A | * | 5/1959 | Krasker | A47J 31/02 |
| | | | | | 426/433 |
| 3,747,414 | A | * | 7/1973 | Ohno | G01F 19/00 |
| | | | | | 215/11.1 |
| 3,985,069 | A | * | 10/1976 | Cavalluzzi | B65D 85/8061 |
| | | | | | 426/77 |
| 4,938,375 | A | * | 7/1990 | Fantacone | A47G 19/2211 |
| | | | | | D9/434 |
| 5,392,901 | A | * | 2/1995 | Kuray | F42B 39/00 |
| | | | | | 206/372 |
| 5,794,802 | A | * | 8/1998 | Caola | A61J 9/00 |
| | | | | | 215/11.1 |
| 6,740,345 | B2 | * | 5/2004 | Cai | B65D 85/8049 |
| | | | | | 426/77 |
| D524,599 | S | * | 7/2006 | Bodum | D7/400 |
| D561,032 | S | * | 2/2008 | Fuchs | D7/590 |
| 8,033,420 | B2 | * | 10/2011 | Roseblade | A47G 19/2211 |
| | | | | | 220/731 |
| 10,464,028 | B2 | * | 11/2019 | Roaks | A61J 9/00 |

* cited by examiner

DEVICE FOR IMPROVING MIXING OF A LIQUID AND A POWDERED SUBSTANCE

CROSS REFERENCE TO RELATED APPLICATIONS

This divisional application claims priority to U.S. patent application Ser. No. 15/125,647 filed on Sep. 13, 2016, which claims priority to International Patent Application No. PCT/EP2015/025010 filed on Mar. 3, 2015, which claims priority to Swedish Patent Application No. 1450291-8 filed on Mar. 14, 2014, the complete disclosures of which are incorporated herein by reference in their entirety.

FIELD OF THE INVENTION

The present invention relates to a device for improving mixing of a liquid and a powdered substance in a bottle. The present invention also relates to a baby bottle comprising a device for improving mixing of a liquid and a powdered substance in the bottle.

The device can advantageously be used in any types of bottles used for mixing a liquid and a powdered substance to a mixture intended to be drunk by humans, such as nursing bottles, baby bottles, feeding bottles, shakers, and water bottles.

BACKGROUND OF THE TECHNOLOGY

When a powdered substance is to be mixed with a liquid, there is a problem to atomize the powder with the liquid to avoid that the powered substance forms lumps in the liquid. This is, for example, a problem when a baby formula substance is to be mixed with water to form a baby formula. Lumps in the baby formula is a problem since the lumps may get stuck in the nipple of the baby bottle and prevents the liquid from passing through the nipple, which disturbs the feeding of the baby.

SE534145C2 discloses a bottle including a vessel having an interior for mixing a liquid and a powdered substance, such as nutritional supplements, and a lid for sealing the vessel. The lid is provided with a nipple having a closable opening arranged to allow a human to drink from the bottle. The bottle includes a device for atomizing the powder with the liquid and thereby improving mixing of the liquid and the powdered substance in the bottle. The device is disposed between the lid and the bottle, and more particularly the device is removably attached to the lid. The device includes an annular rim and a conically shaped grid including a plurality of openings. The grid allows the liquid mixed with the powder to pass through the openings, while preventing lumps from passing through. Further, the grid improves the mixing of the liquid and the powdered substance and by that reduces the number of lumps and the size of the lumps in the mixed liquid and powder.

SUMMARY OF THE INVENTION

It is an object of the present invention to provide an improved device for mixing a liquid and a powdered substance in a bottle. It is a particular object of the present invention to provide a device for improving mixing of a liquid and baby formula substance in a baby bottle.

This object is achieved by a device as defined in claim 1.

The device comprises a body including a grid having a plurality of openings. The invention is characterized in that the body comprises at least two elongated apertures arranged in different radial directions in relation to a central part of the body, and each of the apertures has a cross-sectional area which is more than twice as large as the cross-sectional area of the openings of the grid. With elongated is meant that the length of the aperture is larger than the width of the aperture.

The grid improves the mixing of the liquid and powdered substance when the bottle is shaken, and by that reduces the number of lumps and the size of the lumps in the mixed liquid and powder. However, there may still remain lumps in the liquid after it has been mixed with the powder. The grid further prevents the remaining lumps from reaching a nipple during drinking from the bottle, if the bottle is used as a baby bottle or a water bottle. However, the remaining lumps may cause clogging of the holes in the grid during drinking from the bottle, and by that prevent the liquid from reaching the nipple. The elongated apertures allow the liquid to pass through the device at the same time as it also prevents remaining lumps from passing through the device and reaching the nipple. The apertures ensure that the liquid always can pass through the device, even though the openings in the grid have been clogged and do not let through the liquid. Thus, the flow through the device is improved and stops in the flow are avoided. The apertures are arranged in different radial directions in relation to a central part of the body. By that the apertures become distributed in the body and the flow through the device becomes more even.

According to an embodiment of the invention, the cross-sectional area of the apertures are more than three times the cross-sectional area of the openings of the grid, preferably more than four times as large as the cross-sectional area of the openings of the grid. Thus, it is ensured that the liquid passes through the apertures much easier than through the openings of the grid, which prevents possible lumps from stacking up and stopping the flow of liquid.

According to an embodiment of the invention, the width of the apertures is less than 8 mm, and preferably less than 6 mm. A narrow width of the aperture prevents lumps from passing through the aperture. For example, the width of the apertures is the same as the width of the openings in the grid.

According to an embodiment of the invention, the length of the apertures is at least 8 mm, preferably at least 15 mm, and preferably at least 20 mm. Preferably, the length of the apertures is larger than the width of the openings in the grid to allow the liquid to pass through the apertures. A large length of the aperture enables the liquid to pass through the aperture and prevents lumps from causing clogging of the aperture.

According to an embodiment of the invention, the diameter of the openings of the grid is in an interval of 2-8 mm, and preferably in an interval of 3-6 mm. Preferably, the diameter of the openings is in the same range as the width of the aperture to prevent the lumps from passing through the device.

According to an embodiment of the invention, the apertures are arranged adjacent to the rim. For example, the apertures are arranged between the grid and a rim surrounding the grid. By positioning the aperture adjacent to the rim, the powder is prevented from reaching the nipple during shaking of the bottle, and by that clogging of the nipple is avoided.

According to an embodiment of the invention, the apertures are successively arranged along the periphery of the rim.

According to an embodiment of the invention, the rim is circular and the apertures are elongated in a circumferential direction of the rim, i.e., the apertures are elongated in parallel with the periphery of the rim. Preferably, the apertures are also disposed adjacent to the rim. By positioning the apertures, which are elongated in a circumferential direction of the rim, adjacent to the rim, the powder is prevented from reaching the nipple during shaking of the bottle and clogging of the nipple is avoided.

According to an embodiment of the invention, the grid is mechanically connected to a rim surrounding the grid, and the grid is arranged at a distance from the rim so that the apertures are defined between the rim and a periphery of the grid.

According to an embodiment of the invention, the device comprises a plurality of connection portions extending between the grid and the rim for mechanically connecting the grid to the rim, and the connection portions are arranged so that said apertures are defined between the rim and the periphery of the grid. The connection portions have two functions, to mechanically connect the grid to the rim, and to form walls for defining the apertures. Thus, the apertures are defined by the rim, the connection portions, and the periphery of the grid.

According to an embodiment of the invention, the body is disc shaped having a circular rim. In one embodiment, the body is a planar disc.

According to an embodiment of the invention, the rim is annular and surrounds the grid.

According to an embodiment of the invention, the grid is disc shaped and defines a plane extending radially in relation to the rim.

According to an embodiment of the invention, the device comprises at least three elongated apertures arranged in different radial directions in relation to the central part, and preferably at least four elongated apertures arranged in different radial directions in relation to the central part.

Another object of the present invention is to provide an improved baby bottle. The term baby bottle is used synonymous with nursing bottle and feeding bottle.

This object is achieved by a baby bottle comprising a device for mixing of a liquid and a powdered substance according to the invention. The body comprises a rim designed to bear on an inner surface of a wall of the bottle, and the rim has a shape corresponding to the inner surface of the wall. The grid and the aperture prevent lumps from reaching the nipple and to get stuck in the nipple. The aperture ensures that the liquid always reaches the nipple, even though the grid has been clogged by lumps, and by that ensures that feeding of the baby is not disturbed by stops in the flow of liquid.

According to an embodiment of the invention, the vessel includes a wall having an inner surface defining the interior of the bottle, and the vessel is designed for receiving the device, and the inner surface of the wall is provided with one or more protruding parts to support the device when it is inserted in the bottle.

According to an embodiment of the invention, the baby bottle comprises a mixing device having the apertures disposed adjacent to the rim and a sealing cap for attaching the nipple to the vessel, and the sealing cap comprises an annular flange surrounding the nipple, and the flange is positioned above the apertures. By this embodiment, the baby formula is prevented from reaching the nipple and clogging the opening of the nipple, when the baby bottle is shaken.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
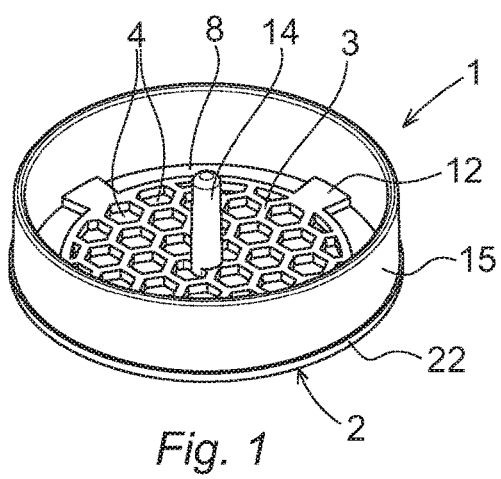
FIG. 1 shows a perspective view from above of a device for mixing a liquid and a powered substance in a bottle according to a first embodiment of the invention.
Figure 2:
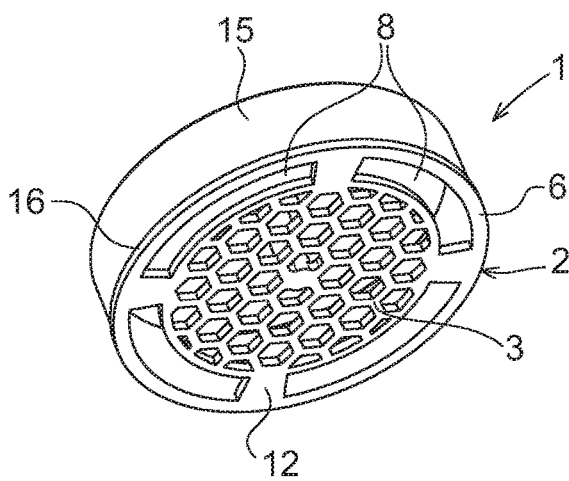
FIG. 2 shows a perspective view from below of the device shown in FIG. 1.
Figure 3:
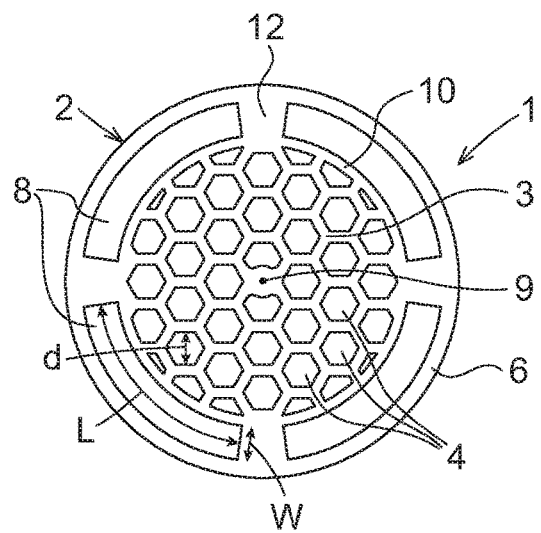
FIG. 3 shows a view from below of the device shown in FIG. 1.

FIGS. 1-3 show a device 1 for mixing a liquid and a powdered substance in a bottle according to a first embodiment of the invention. In the following, the device 1 is named a mixing device. The mixing device 1 comprises a body 2 including a grid 3 having a plurality of openings 4 to let through the liquid, and a rim 6 surrounding the grid 3. The grid 3 is mechanically connected to the rim 6. In this embodiment, the body 2 is shaped as a planar disc and has a circular periphery. However, the body 2 can also be conical. The grid 3 improves the mixing of the liquid and powdered substance when the bottle is shaken and prevents lumps from reaching a nipple during drinking from the bottle. In this embodiment, the openings 4 in the grid are hexagonal shaped. However, the shape of the openings may vary. For example, the shape of the openings can be circular, oval, triangular, rectangular or pentagonal. The shape and size of most of the openings 4 are identical. However, some of the openings, positioned close to a center of the grid and close to the periphery of the grid, are not full sized. Thus, the diameter d of the openings 4 may vary. The diameter of the full-sized openings of the grid 3 is preferably between 2 and 8 mm, most preferably between 3 and 7 mm, and typically about 5 mm. The number of openings 4 may vary, but preferably the number of openings is larger than 20, and more preferably larger than 30. Preferably the number of openings 4 is less than 70 and more preferably less than 60. In this embodiment, the grid 3 is disc shaped and has a circular periphery, and the rim 6 is annular.

According to the invention, the device 1 further includes at least two elongated apertures 8 to allow a part of the liquid to pass through the device 1 without passing through the openings 4 of the grid 3. The body 2 is planar and defines a plane, and the apertures are elongated in the plane defined by the body 2. In this embodiment, the apertures 8 and the openings 4 are co-planar. The apertures are designed so that they let the liquid pass through easier than through the grid 3, which prevents possible lumps from stacking up to stop the flow of liquid. In this embodiment, the device 1 includes four apertures 8. However, the number of apertures may vary. Preferably, the number of apertures is between two and ten, and most preferably between two and six. The number of apertures 8 is significantly less than the number of openings 4 in the grid 3. The apertures 8 have a cross-sectional area which is significantly larger than the cross-sectional area of the openings 4 of the grid 3. In this embodiment, the cross-sectional area of the apertures 8 is more than four times as large as the cross-sectional area of the openings 4. Preferably, the width w of the apertures 8 is about the same as the width of the openings of the grid 3. Preferably, the width w of the apertures 8 is in an interval of 2-8 mm, and most preferably in an interval of 3-6 mm. The width of the apertures is typically about 5 mm. The length L of the apertures is at least 8 mm, preferably at least 15 mm, and most preferably at least 20 mm.

The apertures 8 are arranged in four different radial directions in relation to a central part 9 of the body 2. By that the apertures become distributed in the body 2 and the flow through the device 1 becomes more even. In this embodiment, the apertures are arranged adjacent to the rim, i.e. the apertures adjoin the rim 6. The apertures are successively arranged along the rim.

The apertures 8 are arranged between the grid 3 and the rim 6. In this embodiment, the apertures 8 are elongated in a circumferential direction, i.e., in parallel with the periphery of the rim 6. By that the longest side of the aperture is disposed adjacent to the rim 6. The grid 3 is arranged at a distance from the rim 6 in a radial direction so that the apertures 8 are defined between the rim and a periphery 10 of the grid 3. In this embodiment, the apertures are shaped as bent rectangles. However, the shape of the apertures may vary. The device 1 comprises a plurality of connection portions 12 extending between the grid 3 and the rim 6 for mechanically connecting the grid to the rim. The connection portions are arranged so that a plurality of apertures 8 is defined between the rim and the periphery of the grid. In this embodiment, four connection portions 12 are arranged to define four apertures 8. The connection portions 12 may be elements protruding from the grid 3.

The device 1 further comprises a pick up spike 14 located in the center 9 of the grid 3, for easy removal of the device 1 from the bottle. The top of the spike 14 has a sphere-like form. The device 1 further comprises a cylindrical wall 15 surrounding the body. In this embodiment, the rim 6 is a part of the wall 15. A sealing edge 16 is formed along the periphery of the wall and surrounding the device 1. When engaging with the bottle, the sealing edge 16 prevents liquid from getting stuck between the wall 15 of the mixing device and an inner surface of the bottle.

The mixing device may be comprised of a rigid material such as plastic, for example, BPA (Bisphenol A) and DEHP (2-ethylhexyl) free plastic, or other similar material. The mixing device is preferably made in one piece, for example, by casting in a mold.

Figure 4:
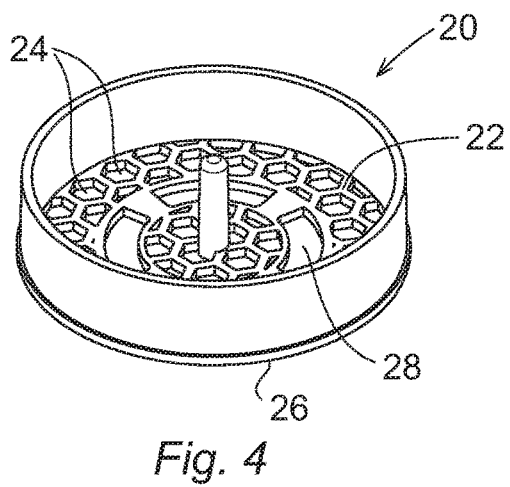
FIG. 4 shows a perspective view from above of a device for mixing a liquid and a powered substance in a bottle according to a second embodiment of the invention.
Figure 5:
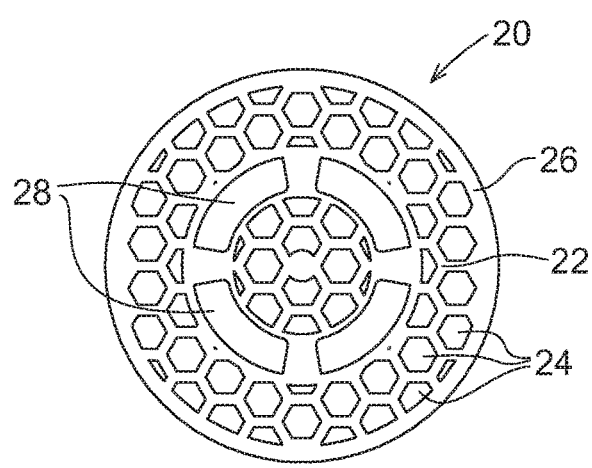
FIG. 5 shows a view from below of the device shown in FIG. 4.

FIGS. 4 and 5 show a mixing device 20 according to a second embodiment of the invention. The device 20 comprises a grid 22 including a plurality of openings 24 and a rim 26 surrounding the grid. The grid 22 is provided with a plurality of apertures 28 to allow the liquid to pass through the device 20 without passing through the openings 24 of the grid 22. In this embodiment of the invention, the apertures 28 are arranged at a distance from the rim and are surrounded by the openings 24. In this embodiment, the cross-sectional area of the apertures 28 is more than three times as large as the cross-sectional area of the openings 24 of the grid 22. In this embodiment, the apertures 28 are elongated in a circumferential direction.

Figure 6:
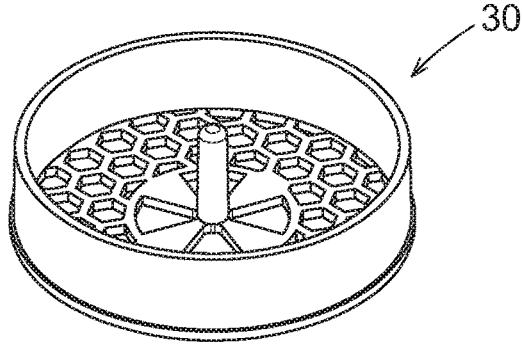
FIG. 6 shows a perspective view from above of a device for mixing a liquid and a powered substance in a bottle according to a third embodiment of the invention.
Figure 7:
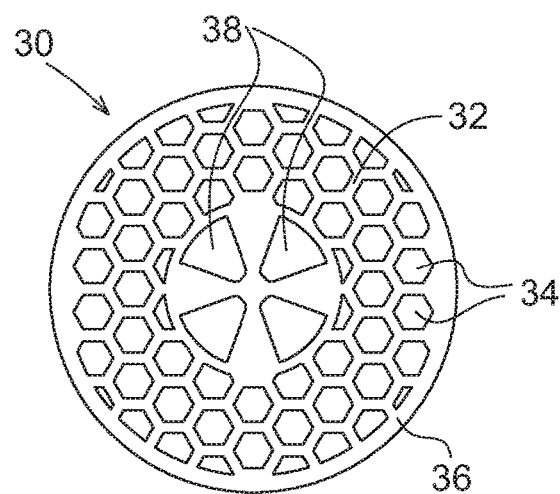
FIG. 7 shows a view from below of the device shown in FIG. 6.

FIGS. 6 and 7 show a mixing device 30 according to a third embodiment of the invention. The device 30 comprises a grid 32 including a plurality of openings 34 and a rim 36 surrounding the grid 32. The grid 32 is provided with a plurality of apertures 38. In this embodiment, the cross-sectional area of the apertures 38 is more than twice as large as the cross-sectional area of the openings 34 of the grid 32. In this embodiment, the apertures 38 are positioned in a central part of the device 30 and the apertures 38 are surrounded by the openings 34. The apertures 38 are elongated in a radial direction and have a triangular shape. The apertures 38 are tapering towards the center of the device.

Figure 8:
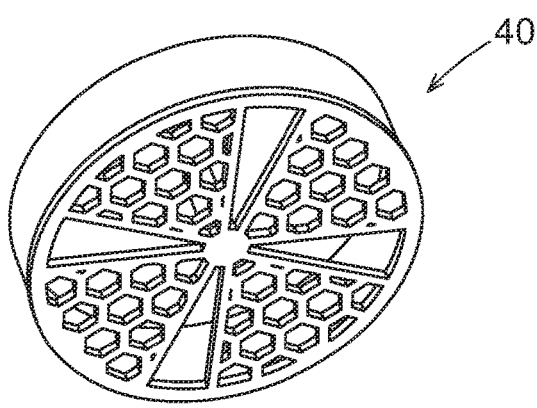
FIG. 8 shows a perspective view from below of a device for mixing a liquid and a powered substance in a bottle according to a fourth embodiment of the invention.
Figure 9:
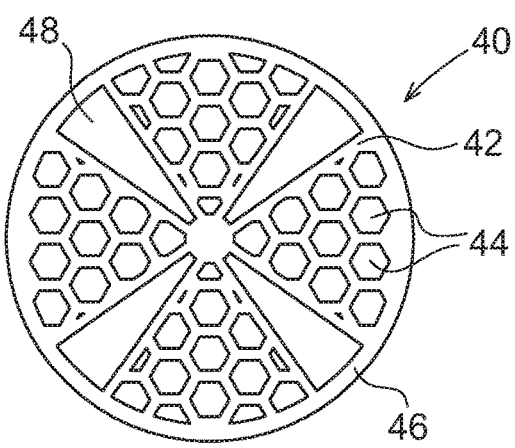
FIG. 9 shows a view from below of the device shown in FIG. 8.

FIGS. 8 and 9 show a mixing device according to a fourth embodiment of the invention.

The device 40 comprises a grid 42 including a plurality of openings 44 and a rim 46 surrounding the grid 42. The grid 42 is provided with a plurality of apertures 48. In this embodiment, the apertures 48 are extending between a central part of the device and the rim 46. The apertures 48 adjoin the rim 46. The apertures 48 have a triangular shape and are elongated in a radial direction. The apertures 48 are tapering towards the center of the device. In this embodiment, the cross-sectional area of the apertures 48 is more than four times as large as the cross-sectional area of the openings 44 of the grid.

Figure 10:
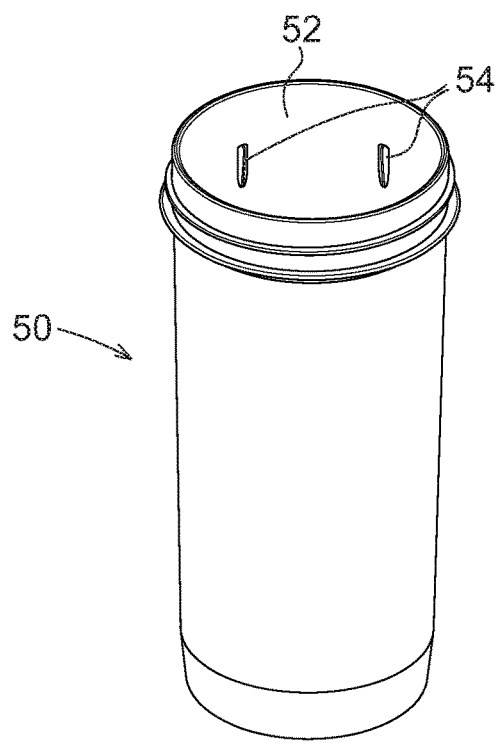
FIG. 10 shows a perspective view from above of a vessel designed for receiving a mixing device according to the invention.

FIG. 10 shows a vessel 50 designed for receiving a mixing device according to the invention. The first vessel has a closed end and an open end. The vessel includes a tubular wall having an inner surface 52 defining the interior of the bottle. The open end of the vessel is designed for receiving the mixing device. The inner surface 52 of the wall is provided with one or more protruding parts 54 to support the mixing device when it is inserted in the bottle. The mixing device, and in particular the sealing edge 16, is bearing on the protruding parts 52. The protruding part may be spikes or a flange. The periphery of the mixing device corresponds to the shape of the interior of the vessel. When the mixing device is positioned in the vessel 50, the sealing edge 16 prevents the liquid from getting stuck in between the wall 15 of the mixing device and the inner surface 52 of the vessel.

Figure 11:
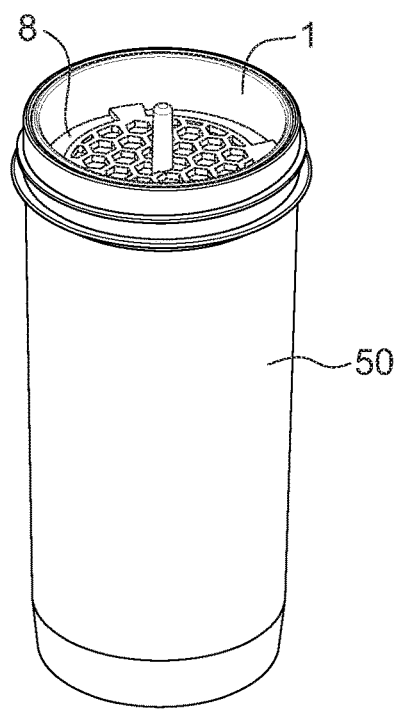
FIG. 11 shows a perspective view from above of a vessel provided with the mixing device shown in FIGS. 1-3.
Figure 12:
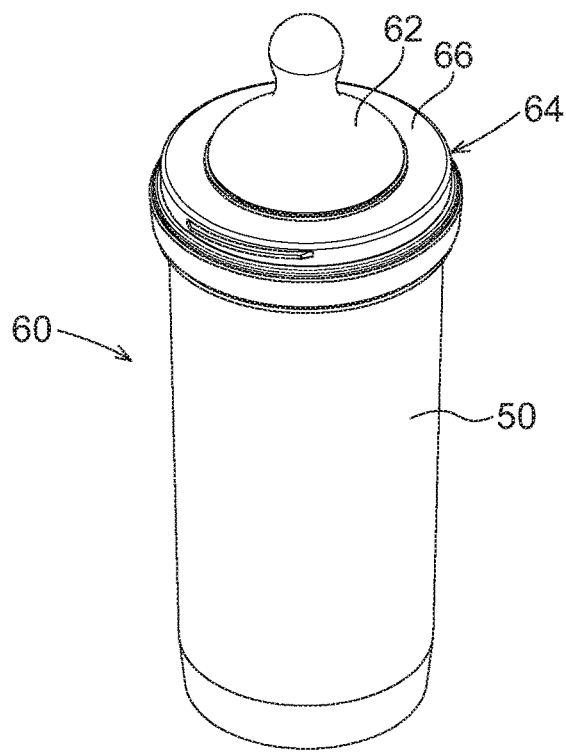
FIG. 12 shows an example of a baby bottle including a mixing device according the invention.

FIG. 11 shows a perspective view from above of the vessel 50 provided with the mixing device 1 as shown in FIGS. 1-3. FIG. 12 shows an example of a baby bottle 60 including the vessel 50 and the mixing device 1. The baby bottle may also include any of the mixing devices 20, 30 and 40. The baby bottle comprises a nipple 62 and sealing cap 64 for sealingly attaching the nipple 62 to the open end of the vessel. The sealing cup comprises an annular flange 66 protruding inwards towards the nipple. The flange 66 is bearing on a corresponding flange of the nipple (not shown). The flange 66 is positioned above the apertures 8 of the mixing device 1 when the sealing cup 64 is attached to the vessel 50. By this embodiment, the baby formula is prevented from reaching the nipple 62 and to clog the opening of the nipple, when the baby bottle is shaken.

The present invention is not limited to the embodiments disclosed, but may be varied and modified within the scope of the following claims. For example, the number or apertures may vary from two and more than four. Further, the shape and position of the apertures may vary. The shape of the periphery of the device depends on the shape of the bottle and may vary, for example, the shape can be oval or rectangular.

What is claimed is:

1. A mixing device for mixing a liquid and a powdered substance in a vessel having an interior defined by a tubular wall and a closed end that houses the liquid and the powdered substance, wherein an inner surface of the tubular wall includes one or more protruding parts that mechanically support the mixing device thereon, the mixing device comprising:
a body that includes:
a solid wall having no apertures and a rim, the rim being shaped to correspond to the inner surface of the tubular wall;
a sealing edge that circumscribes and extends beyond an outer periphery of the solid wall in a circumferential direction, wherein the sealing edge bears on the one or more protruding parts and prevents the liquid from getting stuck in between the solid wall and the inner surface of the tubular wall; and
a planar surface with a grid having a plurality of openings that span an entire surface area of the grid and at least two elongated apertures arranged in a circumferential direction, the openings and the elongated apertures being co-planar, wherein the at least two elongated apertures have a cross-sectional area which is more than twice as large as a cross-sectional area of the openings of the grid.

2. The mixing device according to claim 1, wherein the cross-sectional area of the at least two elongated apertures is more than three times as large as the cross-sectional area of the openings of the grid or more than four times as large as the cross-sectional area of the openings of the grid.

3. The mixing device according to claim 1, wherein a width of the at least two elongated apertures is less than 8 mm.

4. The mixing device according to claim 1, wherein a length of the at least two elongated apertures is at least 8 mm.

5. The mixing device according to claim 1, wherein a diameter of the openings of the grid is between 2-8 mm.

6. The mixing device according to claim 1, wherein the body is circular and the at least two apertures are elongated in a circumferential direction of the body.

7. The mixing device according to claim 1, wherein the rim surrounds the grid and the at least two apertures are arranged adjacent to the rim.

8. The mixing device according to claim 7, further comprising a connection portion that mechanically connects the rim and the grid, the grid being arranged at a distance from the rim so that the at least two apertures are defined between the rim and a periphery of the grid.

9. The mixing device according to claim 8, wherein the connection portion forms a structure that separates the at least two apertures, the connection portion being arranged so that the at least two apertures are defined between the rim and the periphery of the grid.

10. The mixing device according to claim 8, wherein the grid is disc shaped and the rim is annular.

11. The mixing device according to claim 1, wherein the mixing device comprises at least three elongated apertures arranged in the circumferential direction of the rim.

12. The mixing device according to claim 1, wherein a width of the at least two elongated apertures is less than 6 mm.

13. The mixing device according to claim 1, wherein a length of the at least two elongated apertures is at least 15 mm.

14. The mixing device according to claim 1, wherein a length of the at least two elongated apertures is at least 20 mm.

15. The mixing device according to claim 1, wherein a diameter of the openings of the grid is between 3-7 mm.

16. The mixing device according to claim 1, wherein the mixing device comprises at least four elongated apertures arranged in the circumferential direction of the rim.

* * * * *